(No Model.) 7 Sheets—Sheet 4.

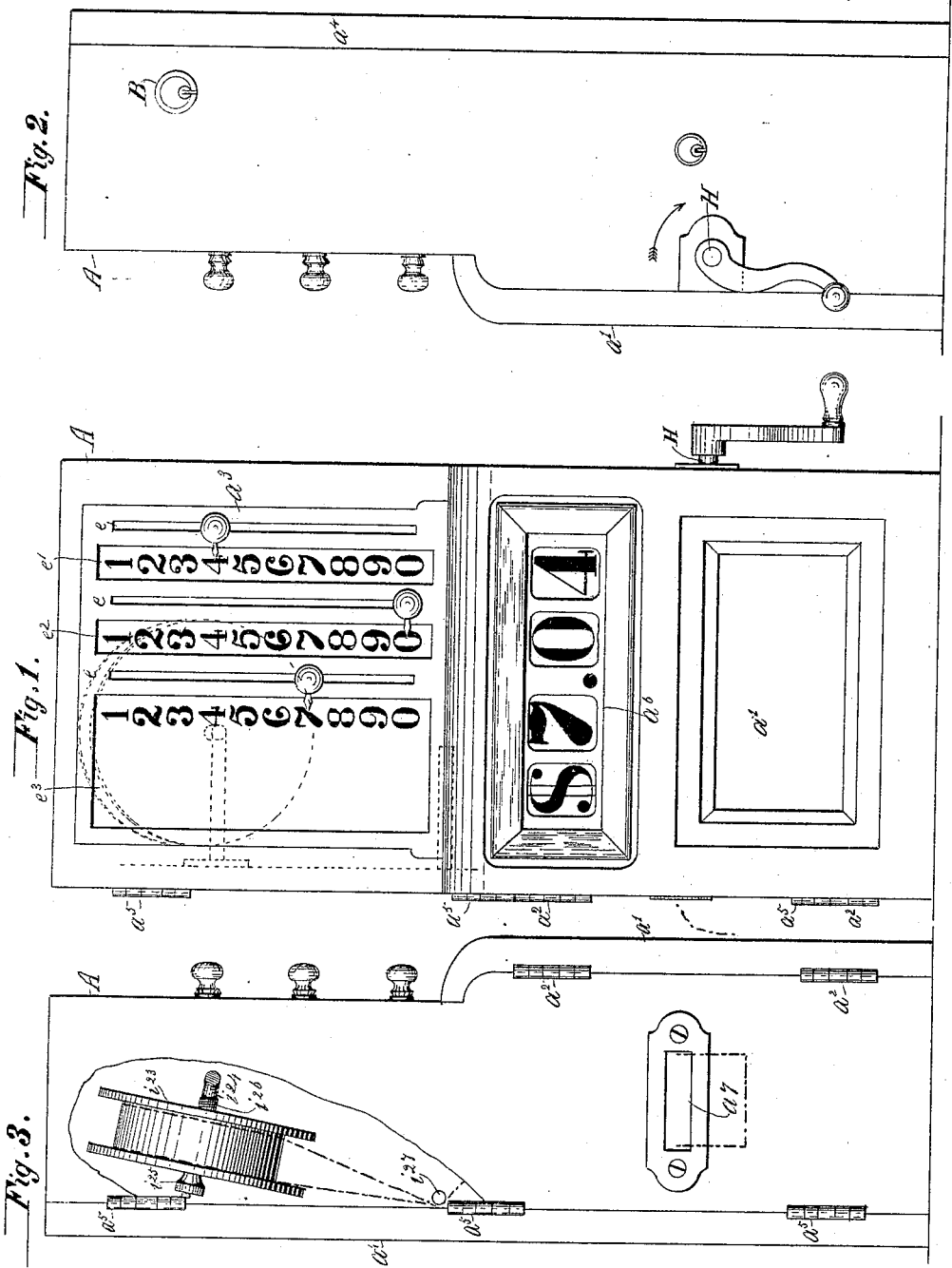

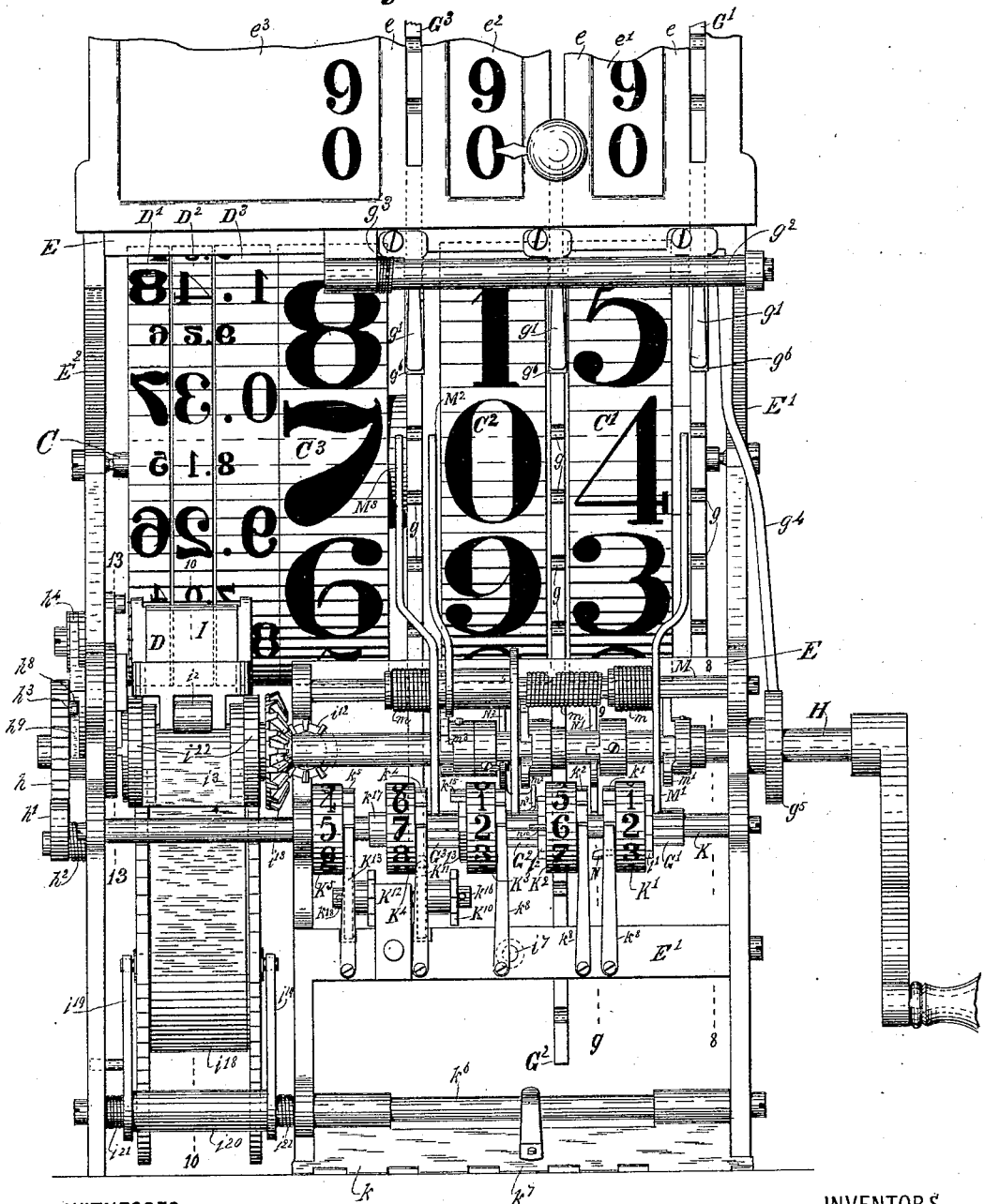

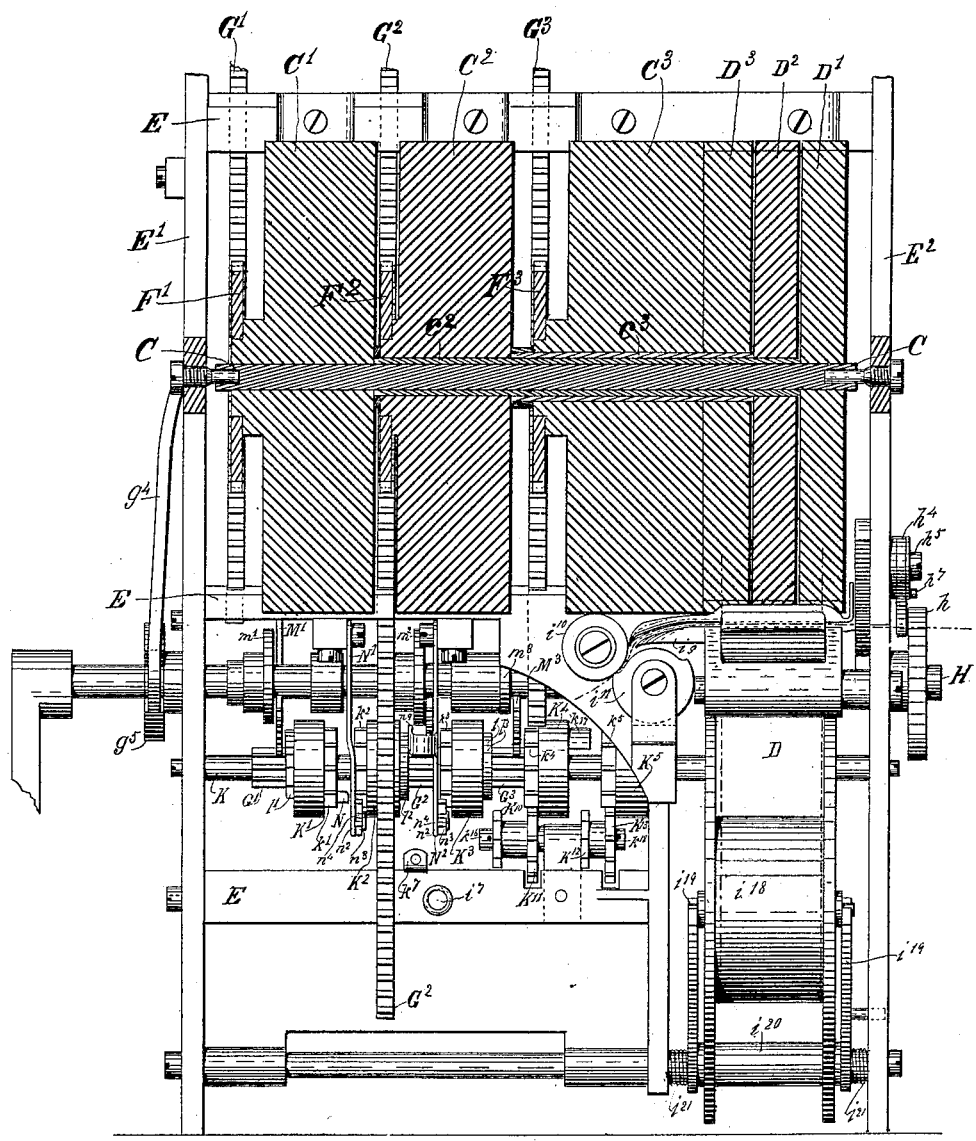

R. H. THOMPSON & E. W. MORTON.
CASH REGISTER, INDICATOR, RECORDER, AND CHECK PRINTER.

No. 552,554. Patented Jan. 7, 1896.

WITNESSES:
William A. Pollock
Walter Smith

INVENTORS
Robert H. Thompson
Edwin W. Morton
BY Edwin H. Barry
their ATTORNEY (No Model.) 7 Sheets—Sheet 5.
R. H. THOMPSON & E. W. MORTON.
CASH REGISTER, INDICATOR, RECORDER, AND CHECK PRINTER.
No. 552,554. Patented Jan. 7, 1896.

WITNESSES:
William A Bullock
Walter Smith

INVENTORS
Robert H. Thompson.
Edwin W. Morton.
BY Edwin H Brown
their ATTORNEY (No Model.) 7 Sheets—Sheet 6.
R. H. THOMPSON & E. W. MORTON.
CASH REGISTER, INDICATOR, RECORDER, AND CHECK PRINTER.

No. 552,554. Patented Jan. 7, 1896.

WITNESSES:
William A Pollock
Walter Smith

INVENTORS
Robert H Thompson
Edwin W Morton
BY
Edwin H Brown
their ATTORNEY (No Model.) 7 Sheets—Sheet 7.

R. H. THOMPSON & E. W. MORTON.
CASH REGISTER, INDICATOR, RECORDER, AND CHECK PRINTER.

No. 552,554. Patented Jan. 7, 1896.

WITNESSES:
Pierson L. Wells.
David N. Mason

INVENTORS,
Robert H. Thompson
and Edwin W. Morton
BY
Edwin H. Brown
THEIR ATTORNEY

UNITED STATES PATENT OFFICE.

ROBERT H. THOMPSON, OF NEW YORK, AND EDWIN W. MORTON, OF WHITE PLAINS, NEW YORK.

CASH REGISTER, INDICATOR, RECORDER, AND CHECK-PRINTER.

SPECIFICATION forming part of Letters Patent No. 552,554, dated January 7, 1896.

Application filed July 22, 1893. Serial No. 481,182. (No model.)

*To all whom it may concern:*

Be it known that we, ROBERT H. THOMPSON, of New York, and EDWIN W. MORTON, of White Plains, New York, have invented a certain new and useful Improvement in Cash-Registers, of which the following is a specification.

We will describe a cash-register embodying our improvement and afterward point out the novel features in the claims.

Figure 7:
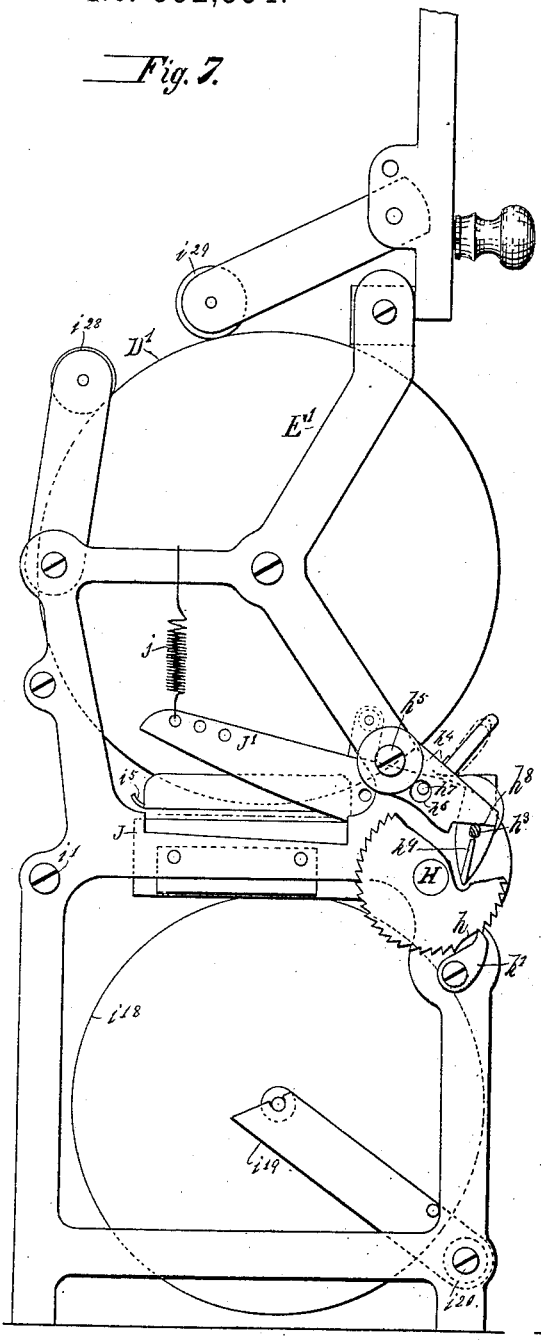
Figure 6:
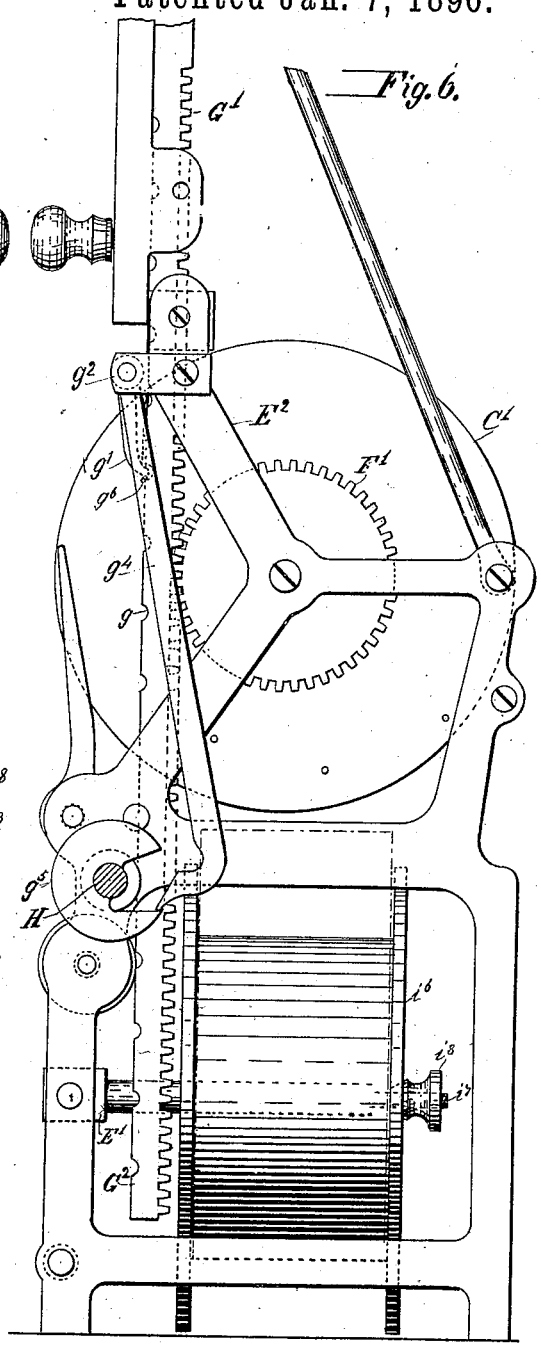
Figure 11:
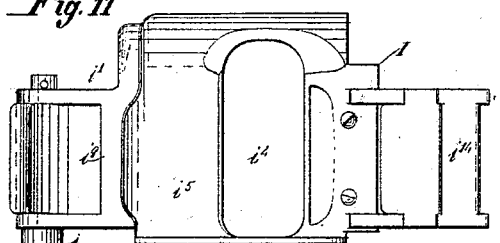
Figure 12:
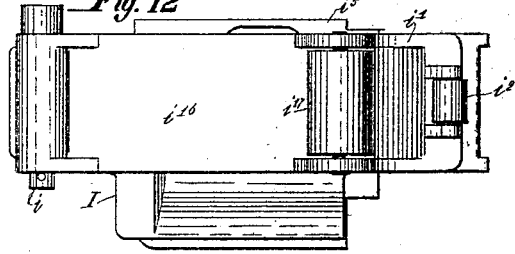
Figure 8:
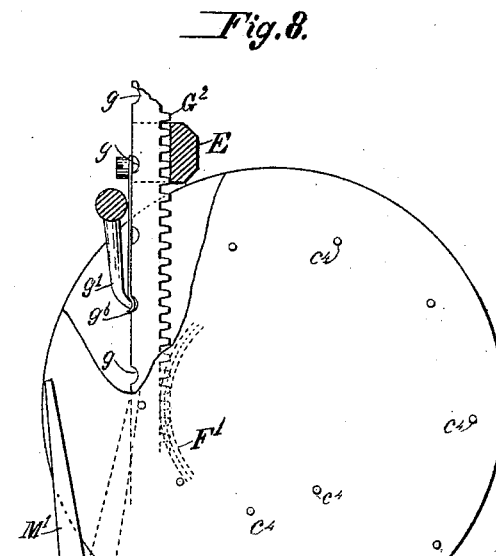
Figure 10:
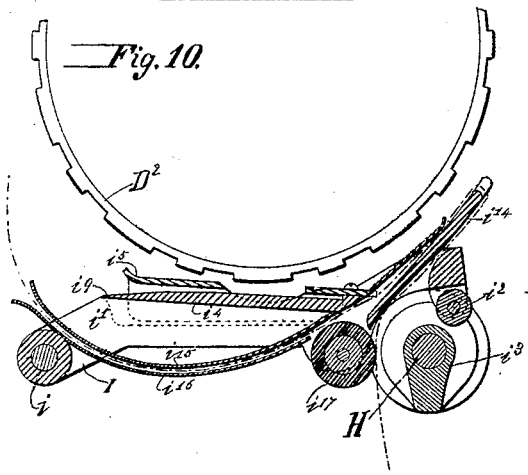
Figure 13:
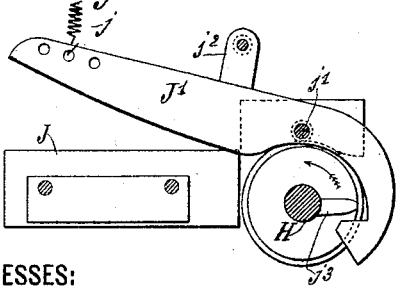
Figure 9:
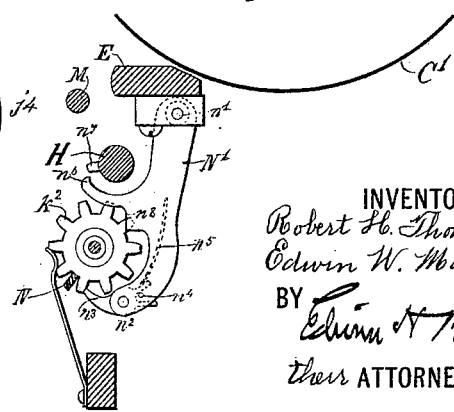
Figure 14:
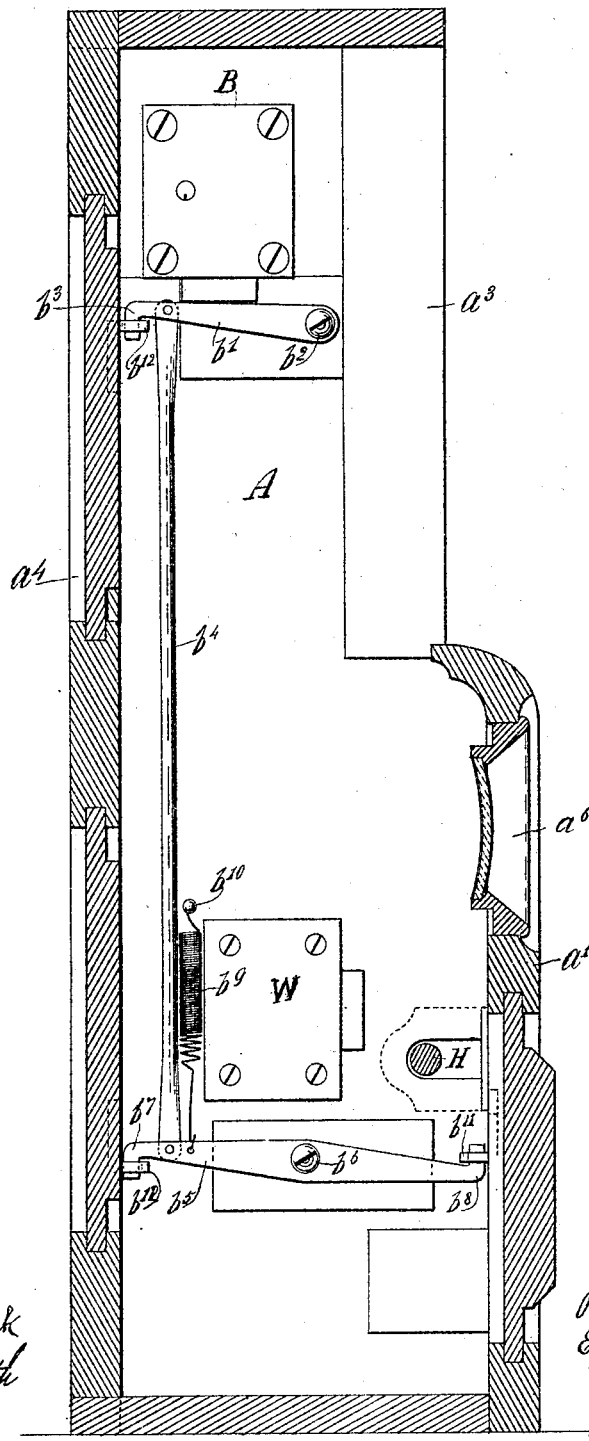
Figure 16:
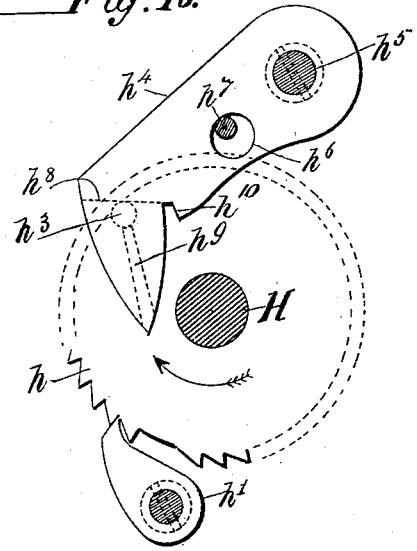
Figure 17:
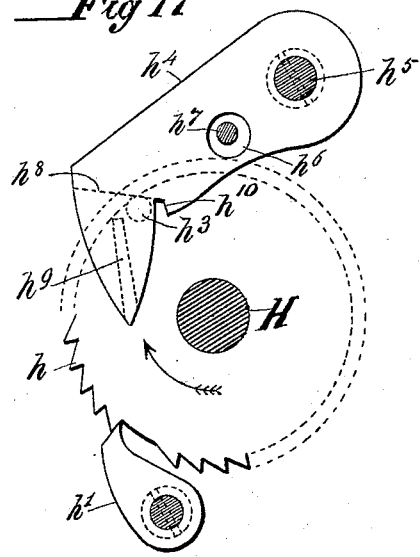
Figure 15:
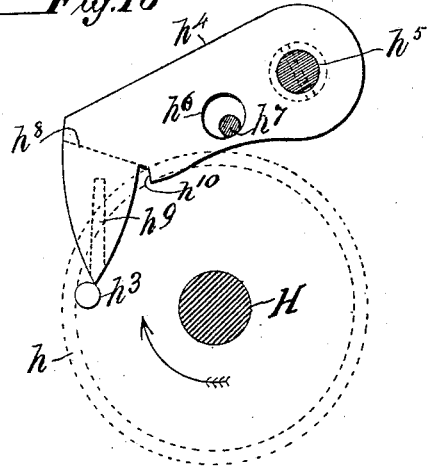
Figure 18:
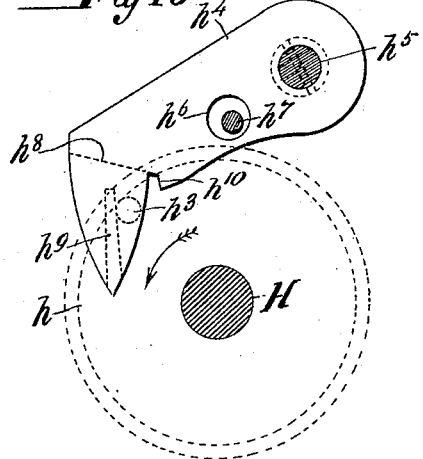

In the accompanying drawings, Figure 1 is a front view of a cash-register embodying our improvement. Fig. 2 is a view of one side thereof. Fig. 3 is a view of the other side thereof, a portion of the case being broken away. Fig. 4 is a front view of the case, the upper portions of certain parts being removed to economize space. Fig. 5 is a back view, the case being removed, certain parts being shown in section and certain portions of the other parts at the top of the machine being omitted. Fig. 6 is a view of the right side of the machine, the case being removed and certain portions of parts in the top of the machine being omitted. Fig. 7 is a view similar to Fig. 6 on the left side of the machine. Fig. 8 is a vertical section taken as indicated by the line 8 of Fig. 4. Fig. 9 is a vertical section taken as indicated by the line 9 of Fig. 4. Fig. 10 is a vertical section taken as indicated by the line 10 of Fig. 4. Fig. 11 is a top view of a movable printing-bed. Fig. 12 is a bottom view of this bed. Fig. 13 is a vertical section taken as indicated by the line 13 of Fig. 4. Fig. 14 is a vertical elevation showing the inner surface of the right side of the case, and including the lock. Fig. 15 is an enlarged view of a device for controlling the movement of the main shaft of the machine, but viewed in the opposite direction to that shown in Fig. 7. Figs. 16, 17, and 18 are views similar to Fig. 15, showing the parts in different positions they are caused to assume by successive movements of the shaft.

Similar letters of reference designate corresponding parts in all the figures.

The machine which we have chosen to illustrate our improvement is not organized for indicating sums greater than ten dollars, ($10;) but of course our improvement is applicable to machines of greater scope.

The machine may have any suitable case. In the present instance we have shown it as provided with a case A, made of wood or any suitable material, having at the lower portion of the front a door $a'$, (see Figs. 1, 2 and 3,) which is connected to the body by hinges $a^2$. Above the door $a'$ is a front opening $a^3$ and at the back is a door $a^4$, which is connected to the body by hinges $a^5$. The doors $a'$ and $a^4$ are intended to be kept locked. Preferably they will be locked by a single lock B. This lock, as seen best in Fig. 14, may be of the ordinary form. Its bolt operates upon a lever $b'$, pivoted at one end by a screw $b^2$ to the inside of the case A and having at the other end a hook $b^3$. Pivotally connected to the lever $b'$ is a rod $b^4$, which extends down the inside of the case, and the lower extremity is pivotally connected to the lever $b^5$. The lever $b^5$ is pivotally connected to the inside of the case by a screw $b^6$ and at the ends is provided with hooks $b^7$ $b^8$, these hooks being extended in opposite directions. A spring $b^9$, connected at one end with the lever $b^5$ and at the other end by a stud $b^{10}$, fixed to the inside of the case A, operates the two levers $b'$ $b^5$, so as to keep the lever $b'$ in contact with the bolt of the lock B. The hooks of these levers engage with hasps $b^{11} b^{12}$, arranged upon the insides of the doors $a'$ $a^4$. By operating the lock B so as to withdraw its bolts the spring $b^9$ will oscillate the levers so that they will release the doors. When the lock is operated so as to shoot or project its bolts the levers will be oscillated so that their hooks will secure the doors.

$C'$ $C^2$ $C^3$, Figs. 4, 5 and 6, designate three indicating parts, which are here shown as made in the form of drums, mounted upon a shaft C. Each drum bears upon its periphery the figures 1, 2, 3, 4, 5, 6, 7, 8, 9, and 0. When the machine is adjusted to indicate any particular amount, the figures on the different drums will be in horizontal rows or lines. One row of these figures will be visible through openings $a^6$ in the door $a'$. The openings may be provided by forming a single long opening through the door, fitting a piece of glass to the door and applying to the inner side of the glass opaque material, such as paper, shaped so as to divide the opening into smaller openings, through which the figures on the drums $C'$ $C^2$ $C^3$ may be seen separately. We have shown a dollar-mark ($) on the left of the main opening and a decimal mark (.) between the two openings for the figures which are to record cents and the opening through which the figures indicating dollars are to be seen. We have shown the shaft C as also supporting three independent printing-wheels $D'$ $D^2$ $D^3$, Figs. 4, 5 and 7. These preferably have their peripheries made up or faced with soft india-rubber, bearing raised figures. The figures will correspond to those on the drums $C'$ $C^2$ $C^3$. They are arranged in horizontal rows.

The printing-wheel $D^3$ may be permanently fixed to the indicating-drum $C^3$, so as to be movable with the latter. We have represented the wheel $D^3$ as secured to or formed with the drum $C^3$. The advantage arises from the saving of mechanism for imparting motion to these parts. Both the wheel $D^3$ and the drum $C^3$ are secured to a tubular shaft $c^3$. With a similar advantage the printing-wheel $D^2$ may be affixed to the indicating-drum $C^2$, and for that reason we have shown both affixed to a tubular shaft $c^2$ surrounding the shaft C. The printing-wheel $D'$ and indicating-drum $C'$ are affixed to shaft C. The shafts $c^2$ $c^3$ surround the shaft C. It will be seen that the shaft $c^3$ turns loosely upon the shaft $c^2$.

The shaft C is supported upon fixed journals extending inward from the side pieces $E'$ $E^2$, the side pieces being secured together by cross-pieces or stretchers E. The said journals are in the form of projections from screws which are inserted in tapped holes in the side pieces $E'$ $E^2$ of the frame.

Preferably the printing-wheels will have two sets of figures. We have shown one set as larger than the other set. The larger set are for printing tickets, which will be handed to purchasers. The smaller set are for printing on a continuous strip of paper or other material D, designed to form a continuous and permanent record of purchases. It will be seen that the printing-wheel carrying the figures for indicating dollars is to the right of those printing-wheels which carry the figures for indicating cents, whereas the arrangement of the drums $C'$ $C^2$ $C^3$ is such as to present the figures for dollars and cents in their natural order.

The smaller set of figures upon the printing-wheels designed for printing the permanent record are shown as arranged in line with the rows of figures upon the indicating-drums $C'$ $C^2$ $C^3$, and the larger set of figures upon the printing-wheels are shown as arranged opposite the spaces between the rows of figures upon the indicating-drums, but this arrangement may be varied.

The means which we have shown for rotating the indicating-drums, and consequently the printing-wheels, consists of gear-wheels $F'$ $F^2$ $F^3$, secured so as to move in unison with the said wheels and racks $G'$ $G^2$ $G^3$, engaging with said gear-wheels. The racks $G'$ $G^2$ $G^3$ are arranged in vertical positions and are guided in the grooves formed in cross-bars or stretchers E of the frame. By moving these racks vertically the indicating-drums and printing-wheels may be oscillated around the axis of the shaft C. In the backs of the racks are notches $g$, Figs. 4 and 6, which co-operate with detents $g'$, extending from a rock-shaft $g^2$. Combined with this rock-shaft is a spring $g^3$ for moving the rock-shaft in such direction as to cause the detents to engage with the notches of the racks. These detents serve to secure proper movements of the indicating-drums, so as to insure the figures of the drums and wheels being adjusted in horizontal lines. An arm $G^4$, affixed to the rock-shaft and formed at its end to co-operate with a notched wheel $g^5$, serves to lock the rack-bars in position by preventing the oscillation of the rock-shaft and keeping the detents in positive engagement with the notches of the racks.

The notched wheel $g^5$ is affixed to a shaft H, which is the driving or main shaft of the machine and may be rotated by a crank outside the case. Normally the notch of the wheel $g^5$ is opposite the lower extremity of the arm $g^4$, and as then the rock-shaft $g^2$ may be oscillated it follows that the rack-bars may be adjusted to different positions. Before the wheel $g^5$, and consequently before the shaft H can be rotated the notches in all the rack-bars must be brought opposite the detents $g'$ to enable the arm $g^4$ of the rock-shaft to be moved entirely beyond the notch of the wheel $g^5$. The wheel $g^5$ and the bars with which it coacts therefore constitute a means of insuring adjustment of the rack-bars before the shaft H can be rotated. As none of the operations for which the machine is intended, saving only the indicating of the amount of the last purchase, can be performed without the rotation of the shaft H, the wheel $g^5$ and the bars coacting therewith preclude the operation of the machine until the rack-bars have been accurately manipulated for adjusting the indicating-drums and printing-wheels. After the notch of the wheel $g^5$ is moved beyond the extremity of the arm $g^4$ the wheel $g^5$ will keep the detents $g'$ locked in engagement with the rack-bars and therefore hold the indicating-drums and printing-wheels stationary until the rotation of the shaft H shall have been completed. The advantage of this, among other things, is that no readjustment of the indicating-drums or printing-wheels can be made after the rotation of the shaft H has begun to cause printing to be done.

To prevent the shaft H from being turned in the wrong direction, a ratchet-wheel $h$, Fig. 7, is affixed to said shaft. A pawl $h'$, pivotally connected to the side piece $E^2$ of the frame and impelled by a spring $h^2$ (see Fig. 4) against the ratchet-wheel, prevents the rotation of the shaft in the wrong direction after the rotation of the shaft has been commenced. At one point in the periphery of the ratchet-wheel it is mutilated or made toothless. This mutilated portion of the ratchet-wheel is opposite the pawl $h'$ when the notch of the wheel $g^5$ is opposite the extremity of the arm $g^4$. Hence at this time a slight backward movement of the shaft H is possible. When the pawl $h'$ has entered the mutilated portion of the ratchet-wheel, after the shaft H has made a complete rotation, the continued onward movement of the shaft will be stopped, by means to be described, until a slight reverse movement of that shaft shall have been made, when the onward rotation may be resumed to again operate the mechanisms of the instrument.

As one complete rotation of the shaft H suffices to perform all the operations for which the instrument is constructed, after an adjustment of the indicating-drums has been made, the prevention of further onward movement, after the completion of the rotation, is highly essential, since it precludes a second operation of the shaft for the same adjusted positions of the indicating-drums from the carelessness or inattention of the operator.

On the side of the ratchet-wheel $h$ which is the nearer to the side piece $E^2$ of the frame a pin or projection $h^3$ is arranged. This pin is intended to co-operate with an arm $h^4$, which at one end is connected by a pin or screw $h^5$ to the side piece $E^2$ of the frame in such a manner that the arm may move about the pin as a center when forcibly depressed or elevated. It may be clamped friction-tight to the side piece of the frame. In other words, it will be incapable of movement about the pin $h^5$ except under the influence of an external force. The arm is only capable of a limited oscillation, by reason of the fact that it is provided with a hole $h^6$, that coacts with the pin $h^7$ extending outwardly from the side piece $E^2$ of the frame. The arm $h^4$ is provided with a downwardly-extending portion at its outer extremity, which is thinner than the main portion of the arm and is mainly situated to one side of the longitudinal median plane of the arm. There will therefore be formed at the junction of the main portion of the arm with the downwardly-extending portion a shoulder $h^8$, which projects across the path of movement of the outer extremity of the pin $h^3$. The downwardly-extending portion of the arm $h^4$ is located to one side of the path traced by the pin $h^3$. A rib or raised portion $h^9$ extends from the thinner or reduced downwardly-extending portion of the arm $h^4$ and projects across the path of movement of the pin $h^3$.

Referring now to Fig. 15, which represents the parts in a position where the pin $h^3$ is about to act upon the arm $h^4$ and the direction of rotation of the shaft H is that indicated by the arrow, it will be seen that the arm $h^4$ is at the greatest elevation it can assume at its outer or free end, and that the rib $h^9$ projects across the path of movement of the pin $h^3$. During the next step in the forward movement of the shaft H the pin $h^3$, sliding along the rib $h^9$, forces the arm $h^4$ downward, and when the arm has been depressed to its lowermost limit, as determined by the pin $h^7$, the pin $h^3$ has passed into the opening between the upper extremity of the rib $h^9$ and the shoulder $h^8$, assuming the position indicated in Fig. 16. Further rotation of the shaft H carries the pin $h^3$ clear of this opening, and the pin sliding along the shoulder $h^8$ elevates the arm $h^4$ to a slight extent, as shown in Fig. 17. A slight movement onward carries the pin $h^3$ against a lip $h^{10}$ provided on the arm $h^4$, and further progress is in consequence stopped. At this time, however, the pawl $h'$ has passed into the mutilated portion of the ratchet-wheel $h$, and the ratchet-wheel can be given a slight reverse movement, which carries the pin $h^3$ against the opposite side of the rib $h^9$, elevating the arm $h^4$ still further, as shown in Fig. 18. The pin $h^7$ may be so arranged with reference to the hole $h^6$ in the arm $h^4$ that this reverse movement of the ratchet-wheel $h$ may be prevented, after the arm $h^4$ has been sufficiently elevated to carry the lip $h^{10}$ out of the path of the pin $h^3$. The onward movement of the shaft H may then be proceeded with.

It will be clear from the description we have given that the arm $h^4$ and the pin $h^3$ preclude the shaft H from being operated a second time. This is important because it precludes an adding mechanism, which is embodied in the machine, from twice adding the same amount, owing to the shaft being accidentally moved more than one rotation.

In addition to the detents $g'$ we have shown other detents $g^6$, Fig. 8, for engaging the notches in the backs of the rack-bars. These detents $g^6$ consist of springs extending downwardly from one of the cross-bars or stretchers E of the frame, and bent near their free ends so as to form teeth for engaging the notches of the rack-bars. The detents $g'$ do not directly engage with the notches in the rack-bars but engage with the backs of the teeth of the detents $g^6$. Adjacent to the rack-bars, the frame of the machine is provided with a series of figures 1, 2, 3, 4, 5, 6, 7, 8, 9, and 0. For each indicating-drum and printing-wheel there is one set of these figures. These sets or series of figures are arranged in vertical rows. They may be marked upon paper, fastened to plates fitted to the frame of the machine, and this portion of the frame may have openings $e'$ $e^2$ $e^3$, separated by bars $e$ and fitted with pieces of glass. It will be seen from Figs. 1 and 4 that these series of figures are visible from the front of the machine. The rack-bars are provided with handles which project between these series of figures. This may be accomplished by vertically slotting the bars $e$ between the openings $e'$ $e^2$ $e^3$.

The indicating-drums and printing-wheels are to be set by adjusting the handles of the rack-bars in positions opposite the figures of the different series—as, for instance, if the drums were to be set at $7.04, as illustrated in Fig. 1, the handle of the left rack-bar would be adjusted opposite the figure 7 of the left row of figures, the handle of the middle rack-bar would be adjusted to a position opposite the 0 of the middle set of figures, and the handle of the right rack-bar would be adjusted to a position opposite the figure 4 of the right set of figures.

We have already stated that there are two sets of printing mechanisms. These mechanisms we will now describe in detail.

I designates a moving bed, pivoted at one end to a pin $i$ supported on the left side piece $E^2$ of the frame, beneath the three printing-wheels $D'\ D^2\ D^3$. This is best illustrated in Figs. 10, 11 and 12. As represented it comprises a main frame $i'$, which may be a casting. This is provided with a roller $i^2$, which co-operates with a cam $i^3$, affixed to the shaft H. In each rotation of the shaft H the cam $i^3$ operating against the roller $i^2$ rocks the bed upwardly upon the pivot $i$, so as to present paper to the printing-wheels.

The bed I is provided with an impression-surface $i^4$, which receives a strip of paper which is intended to be printed to indicate the amount of each purchase and to be divided transversely to form tickets for the purchasers. This strip is fed transversely across the impression-surface $i^4$ of the bed I, and below the guide-plate $i^5$ it is wound upon a roller $i^6$ (see Fig. 6), which is mounted upon a stud $i^7$ that is secured to the cross-piece E of the frame of the machine. The rear end of the stud $i^7$ is screw-threaded, and upon it is fitted a nut $i^8$, which retains the roller $i^6$ in place. A lip $i^9$ extends rearwardly from the impression-surface $i^4$ of the bed I to receive the strip of paper, and the guide $i^5$ extends over this lip. In the guide is an opening large enough to enable the paper to be presented to any one of the top figures upon the printing-wheels. Each adjustment of printing-wheels will stop them with a row of figures above the opening in the guide $i^5$, and while the printing-wheels are at rest the bed I will be raised so as to present the paper to them. The figures on the printing-wheels are so arranged relatively to the figures on the indicating-drums that after each adjustment of the printing-wheels and indicating-drums they will stop, so that the printing-wheels will present to the opening of the guide $i^5$ the same figures which the indicating-drums present to view at the front of the case.

The paper strip which is to be formed into tickets for purchasers is intended to be stiff enough to be pushed through the space between the impression-surface $i^4$ of the bed I and the guide $i^5$. Rollers $i^{10}\ i^{11}$ (see Figs. 4 and 5) are employed to feed it along. The strip passes from the roller $i^6$ between the rollers $i^{10}$ $i^{11}$. The shaft of these rollers is suitably supported by the framework of the machine. The roller $i^{10}$ is an idler, or, in other words, derives motion only from the strip of paper, and has its periphery preferably covered with an elastic material, as rubber, although this construction is not essential. The other roller or master-roller $i^{11}$ has affixed to its shaft a bevel gear-wheel $i^{12}$ that engages with a bevel gear-wheel $i^{13}$, of double the number of teeth, affixed to the shaft H. The master-roller $i^{11}$ is mutilated so that it will co-act with the roller $i^{10}$ to feed the paper strip throughout a portion of each rotation only. Thus it will be prevented from feeding the strip during the printing, also while the strip is being cut to form tickets.

Beyond the impression-surface $i^4$ of the bed I is another impression-surface $i^{14}$. This, it will be seen, is arranged at an angle. When the bed is moved upwardly, a strip of paper passing over the impression-surface $i^{14}$ will be presented to a row of small figures at the bottom of the printing-wheels for the purpose of printing the permanent record. We may remark in passing that when the printing-wheels and indicating-drums stop the figures of the smaller set upon the printing-wheels which will be presented to the impression-surface $i^{14}$ are the same as those which the indicating-drums present to view at the front of the machine. Below the impression-surface $i^4$ are guides $i^{15}\ i^{16}$, which may, if desired, be united at the side edges. This strip of paper passes between the guides in the direction of the length of the bed I. The lower guide $i^{16}$ is terminated close to a loose roller $i^{17}$, which is journaled in the bed I. The other guide $i^{15}$ is extended beyond and to the impression-surface $i^{14}$. The strip of paper, after being printed, passes over the edge of the impression-surface $i^{14}$ and thence underneath the same to the lower portion of the roller $i^{17}$, whence it passes to a roller $i^{18}$. The roller $i^{17}$ preferably has a surface of soft india-rubber, and each time the cam $i^3$ comes opposite it said cam will, in conjunction with the roller, feed the strip of paper onward. The roller $i^{18}$ (see Figs. 4 and 7) is journaled in two arms $i^{19}$, which are affixed to the rock-shaft $i^{20}$, journaled in the frame of the machine. This rock-shaft is combined with springs $i^{21}$, so that the arms $i^{19}$ will be impelled upwardly, the object of this being to maintain the flanges of the roller $i^{18}$ in contact with the driving-wheels $i^{22}$ on the shaft H. This strip is not cut, and the object of driving the roller $i^{18}$ is to enable this roller to take up the strip as fast as it is wound ahead by the cam $i^3$ and roller $i^{17}$.

The strip before being printed is coiled upon a roller $i^{23}$, Fig. 3, which is shown as mounted upon stud $i^{24}$, extending from the left side of the case A of the machine. The extremity of the stud may be screw-threaded and receive a nut $i^{25}$ for retaining the roller $i^{23}$ in place. To produce a tension, a spring $i^{26}$ is coiled upon the stud in such position as to force the roller $i^{23}$ against the nut. Leaving the roller $i^{23}$ the strip passes around the guide-pin $i^{27}$, arranged in the case A of the machine. Thence the paper passes to the space between the guides $i^{15}$ $i^{16}$.

The course of the two strips of paper has been indicated by dotted lines composed of alternate long dots and intermediate short dots, in Figs. 3, 6, 7 and 10.

The inking of the printing-wheels is performed by rollers $i^{28}$ $i^{29}$, mounted on studs supported by the frame of the machine. These rollers may be made of absorbent material and supplied with ink as often as may be necessary, by hand or otherwise.

Having described the printing, we will now take up the mechanism for cutting the strip which is intended to form tickets for purchasers. This strip, after leaving the impression-surface $i^4$ of the bed I, passes between a stationary cutter J and a movable cutter J'. (See Fig. 13.) The stationary cutter J consists of a plate of steel or other suitable material secured to the left side piece $E^2$ of the frame. The movable cutter J' is pivotally connected by a stud $j'$, extending from the side piece $E^2$ of the frame. A spring $j$, fastened at one end to the cutter J' and at the other end to the side piece $E^2$ of the frame, raises the cutter as far as permitted by a stop $j^2$, consisting of a plate fastened to the inner surface of the side piece $E^2$ of the frame. The descent of the movable cutter J' is effected by a cam or wiper $j^3$, arranged upon the shaft H and co-acting with a curved shank $j^4$ belonging to the cutter J'. The extremity of the shank $j^4$ is V-shaped on the side toward the cam or wiper $j^3$. Hence when the cam or wiper reaches it, it depresses the cutter J' and after passing beyond the V-shaped extremity of the shank $j^4$ allows the spring $j$ to release the cutter. An opening $a^7$ in the side of the case A allows each ticket cut from the strip, which is printed in the form of tickets, to fall out of the machine, so that a purchaser may receive it.

To avoid any possible misconstruction of the manner in which the mutilated master-roller $i^{11}$ serves to allow the paper strip to dwell during the printing and also during the cutting, we may add that the printing is performed while the mutilated portion of the master-roller is transversely opposite the roller $i^{10}$, and that the cutting is done after the active or feeding portion of the roller has passed entirely beyond the roller $i^{10}$ and then presented its mutilated portion to the roller $i^{10}$.

We will now describe a mechanism whereby the purchases will be added together as the machine is used.

$K'$ $K^2$ $K^3$ $K^4$ $K^5$ designate five wheels mounted loosely upon a shaft K, supported by the frame of the machine. Each of these wheels bears upon its periphery a series of figures 1, 2, 3, 4, 5, 6, 7, 8, 9 and 0. In front of them a plate $k$ may be arranged. As here shown, this is fixed to a rod $k^6$, supported by the lower bar of the frame of the machine and having notches or openings in its upper edge opposite the peripheries of the wheels $K'$ $K^2$ $K^3$ $K^4$ $K^5$. A spring-catch $k^7$, extending from the rear side of the plate $k$ and capable of engaging with the cross-bar E of the frame, serves to hold the plate normally in position. The amount added by the adding mechanism may be read at any time by opening the case and reading along the line of notches or openings in the upper edges of the plate $k$.

Affixed to the adding-wheels $K'$ $K^2$ $K^3$ $K^4$ $K^5$ are toothed wheels $k'$ $k^2$ $k^3$ $k^4$ $k^5$, which have the function of stop-wheels, and hence may for convenience be referred to herein as "stop-wheels," and coact with detents which are shown as made in the form of springs $k^8$, extending from the cross-piece E of the frame, the purpose of the detents being to hold the adding-wheels against accidental rotation.

At the sides of the adding-wheels $K'$ $K^2$ $K^3$ $K^4$ $K^5$ are pinions $G'$ $G^2$ $G^3$, which like the adding-wheels are loosely mounted upon the shaft K. Affixed to these pinions are ratchet-wheels $l'$ $l^2$ $l^3$, which are attached to the sides of the adding-wheels $K'$ $K^2$ $K^3$ and coact with pawls $l$ consisting of springs fastened at one extremity to the adding-wheels and bent at the other extremity to form a tooth or hook for engaging the teeth of the ratchet-wheels. Motion is imparted to the pinions $G'$ $G^2$ $G^3$ by means of levers $M'$ $M^2$ $M^3$, moved in one direction by cams $m'$ $m^2$ $m^3$, affixed to the shaft H, and moved in the other direction by springs $m$. The levers are provided with sleeves, which loosely fit a stud or pin M supported by the frame of the machine. Pins $m^4$ (see Fig. 8) extending from the levers $M'$ $M^2$ $M^3$ extend across the peripheries of the cams $m'$ $m^2$ $m^3$. The lever $M^2$ is made in two parts connected to opposite ends of the sleeves or hub of this lever, and the spring $m$ of this lever is coiled around the rod M, instead of being coiled around the sleeve or hubs of the levers. The springs $m$ belonging to the levers $M'$ $M^3$ are coiled around the sleeves or hubs of the levers. At one end the springs are fastened to the levers and at the other end have a bearing against a cross-bar of the machine-frame.

From the sides of the indicating-drums extend a series of pins $c^4$. These are located at different distances from the centers of the drums, as will be seen by reference to Fig. 8. There is a pin $c^4$ extending from the side of the indicating-drums for each symbol or letter on their peripheries, and so arranged that when an indicating-drum is adjusted to any position the corresponding arm $M'$ $M^2$ $M^3$ is drawn against and contacts at its upper end with its respective pin $c^4$. As the pins $c^4$ are placed at different distances from the center of the indicating-drums, it is evident that the arms $M'$ $M^2$ $M^3$ will assume a different position for each adjustment of the indicating-wheels. The normal positions of the arms $M'$ $M^2$ $M^3$, as determined by the pins $c^4$, also determines the amount of movement that can be imparted to them by the respective cams $m'$ $m^2$ $m^3$. The lower ends of the levers $M'$ $M^2$ $M^3$ are made in the form of toothed segments and engage with the pinions G' G² G³. When the levers are oscillated they oscillate the pinions to and fro upon the shaft K, but owing to the use of the ratchet-wheels and pawls motion in only one direction is imparted to the adding-wheels. Consequently the latter rotate always in the same direction, although they move intermittently. The cam $m^2$ is shown as set so as to operate somewhat after the cam $m'$, and the cam $m^3$ is shown as set so as to operate somewhat after the cam $m^2$.

We will now describe the mechanism for carrying from one of the adding-wheels to the next. From that side of the adding-wheel K' to which the stop-wheel $k'$ is affixed there projects a pin or tooth N. The end of this pin or tooth is shown as being about midway between the stop-wheel $k'$ of the adding-wheel K' and the stop-wheel $k^2$ of the adding-wheel K². It projects in the plane of the lever N', (see Fig. 9,) which at its upper end is pivotally connected by a pin $n'$ with a cross-bar of the machine-frame. The lower part of this lever is provided with a curved portion $n^2$, and at its lower end carries a pawl $n^3$, that engages with the stop-wheel $k^2$ of the adding-wheel K². A portion of this pawl is bifurcated to engage with a pin $n^4$, employed to limit its independent motion. A spring $n^5$, carried by the lever and pressing against the pawl, holds the latter in engagement with the stop-wheel $k^2$. The lever has a curved arm $n^6$, with which a toe or wiper $n^7$, projecting from the shaft H, coacts when the latter is rotated to swing the lever N' forward, thereby insuring the forward or normal position of the lever N' preparatory to its being moved backward by the pin N in the following manner: Below the arm $n^6$ the lever N' is provided with a surface $n^8$, with which the pin N coacts to swing the lever backward. When the lever N' is moved backward by the pin or tooth N, its pawl $n^3$ will engage with another tooth of the stop-wheel $k^2$, almost immediately after which the toe or wiper $n^7$ coacts with the arm $n^6$ to move the lever forward, thus moving the stop-wheel $k^2$ and consequently the adding-wheel K² forward. This movement will be of such extent as to present the next number on the adding-wheel K². A lever N² is supported and combined with the stop-wheel $k^3$ of the adding-wheel K³ in the same manner that the lever N' is supported and combined with the stop-wheel $k^2$ and adding-wheel K². The lever N² has a lateral extension $n^9$ which corresponds to the surface $n^8$ of the lever N' and is acted upon by a pin or tooth $n^{10}$ extending laterally from the adding-wheel K².

We will now explain how the adding-wheels K⁴ K⁵ derive motion. Projecting laterally from that side of the adding-wheel K³ which is adjacent to the adding-wheel K⁴ is a long tooth $k^{15}$, which once in every rotation of the adding-wheel K³ engages with a tooth of a wheel K¹⁰, thus rotating the latter one tooth forward. The wheel K¹⁰ is mounted loosely upon a stud $k^{16}$, supported by a cross-bar of the machine-frame. It has a laterally-extending hub, on which is affixed a gear-wheel K¹¹ that engages with the stop-wheel $k^4$ of the adding-wheel K⁴. Thus each time that the wheel K¹⁰ is moved forward one tooth the adding-wheel K⁴ will be moved far enough to present another figure. That side of the adding-wheel K⁴ which is adjacent to the adding-wheel K⁵ is provided with a long tooth $k^{17}$, which once in each rotation of the adding-wheel K⁴ coacts with a toothed wheel K¹², mounted loosely upon a stud $k^{18}$. This wheel K¹² has a laterally-extending hub, to which is affixed a gear-wheel K¹³ that engages with the stop-wheel $k^5$ of the adding-wheel K⁵. Thus when the wheel K¹² is moved forward one tooth the adding-wheel K⁵ will be made to present another figure.

It will be seen that we have produced a very simple machine whereby the amounts of purchases will be indicated by indicating-drums, a ticket will be printed and delivered, indicating the amount of each purchase, a permanent record of all purchases will be produced, and the amounts of all purchases will be added together.

It will be seen that the arm $g^4$ which co-acts with the wheel $g^5$ on the shaft H may have a lock W combined with it. A key may be inserted to operate this lock from outside the case A. The purpose of this lock is to enable a person having charge of a store to lock the cash-register, so as to absolutely preclude its use for any time—for instance, when he is to be absent from the store.

If desirable, a rearrangement of parts may be made so as to render it possible to read from the back of the machine the series of figures, which in the present example of our improvement are located within the openings $e'$ $e^2$ $e^3$. This will be advantageous where the machine is to be located between a clerk and the purchaser—as, for example, upon a counter—for then the clerk may read the figures which are located in the openings $e'$ $e^2$ $e^3$, while the customer can read the figures presented by the drums C' C² C³. The figures located within the openings $e'$ $e^2$ $e^3$ may preferably be termed "figures upon stationary tablets." These tablets, the pointers and the racks in the present example of our improvement are employed for adjusting the indicating-drums, and may be entirely omitted if the indicating-drums are made accessible, so that they may be adjusted by a force applied directly to them.

Broadly considered, the drums C' C² C³ are indicating-drums or parts bearing series of figures, and the printing-wheels D' D² D³ are, broadly considered, printing-forms.

The drums C' C² C³, which, broadly considered, are indicating parts for indicating prices of articles purchased, are, it will be seen, combined with various other mechanisms which may be generically termed "independent" and "additional" recording mechanism.

The adding mechanism is one example of independent and additional recording mechanism, and so is the printing mechanism.

What we claim as our invention, and desire to secure by Letters Patent, is—

1. In a cash register, the combination of a number of drums having indicating symbols upon their peripheries, a number of printing drums each having two series of printing types arranged upon its periphery in substantially the same plane transverse to its axis, a hinged bed or platen provided with two impression surfaces over each of which a paper strip is passed, means for actuating the bed or platen and causing both strips to be printed upon, and means for severing one of said strips to form detached checks, substantially as specified.

2. In a cash register, in combination with indicating and recording parts, a total adding mechanism, whose movement is in part controlled by said indicating parts, and which consists of a series of adding wheels, stop wheels, spur wheels having a pawl and ratchet connection to adjacent adding wheels, levers coacting at one extremity with pins or studs provided upon the indicating parts, and provided at the opposite extremities with toothed segments meshing with said spur wheels, and means for actuating an adding wheel upon the completion of the rotation of an adjacent adding wheel, substantially as specified.

3. In a cash register, the combination of indicating parts for indicating the amount of sales, stops or pins on these indicating parts, recording parts for recording the amount of sales, means for adjusting these parts, adding wheels for preserving the total amount of individual sales, stop wheels attached to said adding wheels, spur wheels having a pawl and ratchet connection to adjacent adding wheels, segmental toothed levers meshing with said spur wheels and adapted to press against said pins or stops at their free ends, a shaft provided with cams for actuating these segmental levers and pivoted levers for actuating an adding wheel upon the completion of the rotation of an adjacent adding wheel, substantially as specified.

4. The combination of a number of adding wheels provided with stop wheels, spur wheels attached to these adding wheels by a pawl and ratchet connection, segmental toothed levers which mesh with the spur wheels, and which are provided with transversely extending pins or studs, a shaft having cams which coact with these pins or studs to rock the segmental toothed levers, drums provided with pins at varying distances from the center for defining the normal or initial positions of the said segmental levers, springs for moving these levers immediately preceding their movements in a direction opposite to that in which they are moved by said cams, and pivoted levers for actuating an adding wheel upon the completion of the rotation of an adjacent adding wheel, substantially as specified.

5. The combination of a series of adding wheels, stop wheels attached to these adding wheels and provided with projecting pins, spur wheels having a pawl and ratchet connection to adjacent adding wheels, pivoted levers extending into the paths of motion of said projecting pins and which are provided with pivoted pawls at one end for coacting with said stop wheels and which are also provided with curved projecting arms, a shaft having a series of projections along its length for coacting with said projecting arms to move the said pivoted levers in a direction opposite to that in which said levers are moved by pins on said stop wheels, whereby motion from one adding wheel may be transmitted to the next higher adding wheel, substantially as specified.

6. In a cash register, the combination of indicating parts for indicating the amount of sales, stops or pins extending from these indicating parts, recording parts for recording the amounts of sales, means for adjusting these parts, a series of adding wheels for preserving the total amount of individual sales, levers which are spring pressed into contact with these pins or stops and by which the initial or normal positions are determined for actuating these adding wheels, and a shaft for actuating said levers, substantially as specified.

7. A device for preventing the continuous rotation of a shaft comprising in combination a ratchet wheel secured to the shaft and provided with a mutilated portion, a pin or stud extending from the ratchet wheel, a pivoted arm provided with a shoulder with which said pin is adapted to coact and a raised portion or rib attached to said arm and with the sides of which said pin or stud is adapted to coact to move the pivoted arm into and out of a position in which the shoulder extends across the path of said pin, substantially as specified.

In testimony whereof we have signed our names to this specification in the presence of two subscribing witnesses.

ROBERT H. THOMPSON.
EDWIN W. MORTON.

Witnesses for Robert H. Thompson:
CHARLES H. SHAW,
EDWIN H. BROWN.

Witnesses for Edwin W. Morton:
JOHN A. SNEDEKER,
JOSEPH H. MEAD.